March 6, 1928.　　　　　　　E. A. SHADID　　　　　　　1,661,972
OIL DRAINER AND CLEANER
Filed Oct. 11, 1926
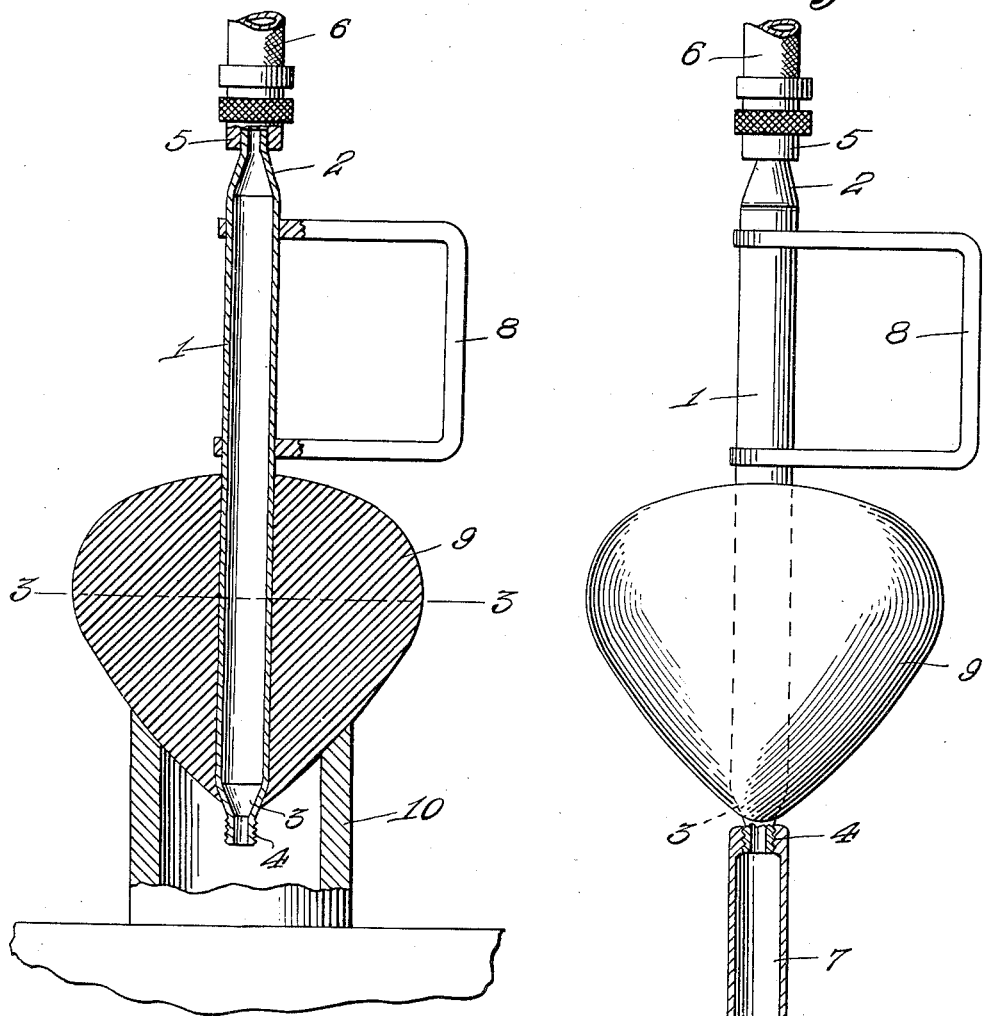

Patented Mar. 6, 1928.

1,661,972

UNITED STATES PATENT OFFICE.

ELIAS A. SHADID, OF MANGUM, OKLAHOMA.

OIL DRAINER AND CLEANER.

Application filed October 11, 1926. Serial No. 141,014.

This invention relates to means for introducing compressed air into a crank case for expelling oil therefrom and also for directing an air blast against objects to clean the same, the general object of the invention being to provide a tubular member which is adapted to be connected with a supply of air and passing through a body of rubber or the like which has a conical part for closing the end of the inlet or other hollow member into which the air is to be forced.

A further object of the invention is to provide an extension nozzle which is adapted to be threaded to the outer end of the tubular member so that the air blast can be directed against the objects to clean the same.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view showing the device used to force oil from a crank case of an internal combustion engine.

Figure 2 is a view, partly in section, showing an extension nozzle connected with the device.

Figure 3 is a section on line 3—3 of Figure 1.

As shown in these views, 1 indicates a tube which is provided with constricted ends 2, one extremity of which is externally screw threaded, as at 4. The plain extremity is adapted to receive the chuck 5 of an air hose 6 which is connected with any suitable source of compressed air. The other end of the device is adapted to be threaded into a threaded end of an extension nozzle 7 when such nozzle is desired to be used in connection with the device. A U-shaped handle member 8 is connected with the tube 1 and a member 9 of rubber or the like is provided with a longitudinally extending bore through which the member 1 passes. This member 9 has a conical shaped lower part so that it will fit in inlets or hollow members of various sizes to close the same and thus prevent the air introduced into the inlet from the member 1 from escaping.

Figure 1 shows the device placed on the oil filling tube 10 of an internal combustion engine to cause the air blast to force the oil and other foreign matter from the crank case of the motor. As will be seen, the member 9 tightly closes the mouth of the filler tube and thus prevents the escape of air therefrom.

The device is also useful in draining the grease from the differential of a motor vehicle and in cleaning the same.

Figure 2 shows the device supplied with an extension nozzle 7 so that it may be used for directing the air blast against objects to clean the same.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a tube having constricted ends, one extremity of which is externally screw threaded so that an extension nozzle can be attached thereto and the other end being adapted to receive a chuck of an air hose, a U-shaped handle connected with the upper portion of the tube and a resilient member surrounding the lower portion of the tube but leaving the threaded extremity exposed, the lower portion of said member being of conical shape so that it will fit in inlets or hollow members of various sizes to close the same.

In testimony whereof I affix my signature.

ELIAS A. SHADID.